United States Patent [19]

Taniyama et al.

[11] 4,332,857
[45] Jun. 1, 1982

[54] PRIMER COMPOSITION AND A METHOD FOR TREATING A PLASTICS SUBSTRATE USING THE SAME

[75] Inventors: Susumu Taniyama, Toyonaka; Goro Shimaoka, Sakai, both of Japan

[73] Assignee: Mitsubishi Gas Chemical Company, Inc., Tokyo, Japan

[21] Appl. No.: 118,107

[22] Filed: Feb. 4, 1980

[30] Foreign Application Priority Data

Feb. 5, 1979 [JP] Japan ................... 54-12018

[51] Int. Cl.$^3$ ............... C12C 3/04; C08F 220/20; B32B 27/30
[52] U.S. Cl. ................... 428/412; 428/447; 427/164
[58] Field of Search ............... 427/164; 428/412, 447, 428/46

[56] References Cited

U.S. PATENT DOCUMENTS

| | | | |
|---|---|---|---|
| 3,707,397 | 12/1972 | Gagnon | 428/412 |
| 3,935,346 | 1/1976 | Stengle | 428/412 |
| 4,197,335 | 4/1980 | Goossens | 427/164 |
| 4,199,421 | 4/1980 | Kamada | 427/164 |
| 4,210,699 | 7/1980 | Schroeter | 428/412 |

FOREIGN PATENT DOCUMENTS

| | | | |
|---|---|---|---|
| 2018619 | 10/1979 | United Kingdom | 428/412 |
| WO/8000942 | 5/1980 | PCT Int'l Appl. | 428/412 |

*Primary Examiner*—Sam Silverberg
*Attorney, Agent, or Firm*—Browdy and Neimark

[57] ABSTRACT

A primer composition is prepared by dissolving in an organic solvent one or more diacryloyloxy compounds of the formula:

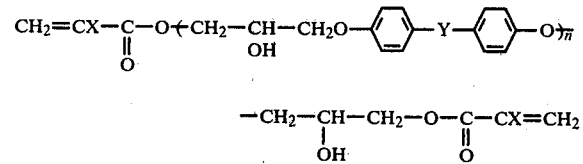

(wherein X is a hydrogen or methyl group; Y is a linear or branched-alkylene group having less than 8 carbon atoms or a binding group selected from the group consisting of $$-O-;\ -S-,\ -SO_2-\ \text{and}\ -\underset{\underset{O}{\|}}{C}-;$$

n is an integer of from 1 to less than 10). Such primer composition is used as an adhesive inner layer to bond a top-coating finish to a plastic substrate.

11 Claims, No Drawings

PRIMER COMPOSITION AND A METHOD FOR TREATING A PLASTICS SUBSTRATE USING THE SAME

BACKGROUND OF THE INVENTION

1. Field of the Invention

This invention relates to a primer composition for a plastics substrate as well as a method for treating the surface of the plastics substrate by using such primer. More particularly, this invention relates to a primer composition for a plastics substrate comprising one or more specific diacryloyloxy compounds dissolved in an organic solvent and to a method for treating the surface of a plastics substrate comprising coating the surface of the plastics substrate with the primer, coating a curable resin-containing top-coating finish over the primer-coated plastics substrate and curing the finish to thereby prepare a desired coated product.

2. Description of the Prior Art

In recent years, shaped transparent plastics articles such as shaped articles of polycarbonate, polymethyl methacrylate polyvinyl chloride, polystyrene or cellulose butyrate and so forth have been used to replace glass in many applications because of their transparency and light weight. But the fact is that, to date, their use has been limited because of their vulnerability to abrasion and loss of transparency.

Several methods have been proposed to eliminate such defects of the shaped transparent plastics article by coating its surface with a transparent finish to provide a protective film coating. And furthermore, many attempts have heretofore been made to provide the surface of the plastics, except for transparent plastic, with a protective film coating to improve the performance of their surface such as chemical resistance, wear resistance and surface hardness.

Usually, a curable resin-containing finish is used as a protective finish for protecting the surface of the shaped plastics article and various kinds of such finishes have been proposed. Above all, finishes containing a carbon functional silane compound such as vinyl group containing silane compound, epoxy group containing silane compound, amino group containing silane compound and so forth are particularly interesting in practical use, since the film coating obtained therefrom has excellent properties.

Some plastics, however, have poor affinity for a cured resin coating covering the surface of the plastic substrate and with these only a very weak bond is obtained between the surface of the plastic substrate and the coating. It is, therefore, necessary that such plastic substrates be treated with a primer to form a primer coating before they are given the final coating.

In consequence of various studies in search for a method of protecting the surface of plastic substrates, especially transparent plastic substrates, there has been successfully prepared a series of silane compounds-containing thermosetting resin compositions that are capable of providing the surface of a transparent plastic substrate with a cured resin coating which satisfies the requirements of high wear resistance, surface hardness, heat resistance and chemical resistance (Japanese Patent Application No. 123,078/1977) and proposed a method for pre-treating a plastic substrate, which has poor affinity for silane compounds-containing a curable protective finish, such as polycarbonate and polymethylmethacrylate, by using diepoxy compounds (Japanese Patent Application No. 67,916/1978).

The above-mentioned pretreatment using diepoxy compounds brings about a remarkable improvement of bond strength between a plastic substrate and curable protective finish which contains a silane compound containing an epoxy group. However, when certain kinds of protective finishes containing a silane compound are used, it has been found that the bond strength between the plastic substrate and the protective coating is lowered after the boiling water treatment.

Therefore, a fully satisfactory pretreatment method for improving significantly the bond strength between the cured resin coating and the plastic substrate has not been obtained in the prior art.

SUMMARY OF THE INVENTION

Accordingly, one object of this invention is to provide a primer composition suitable for a primer-coating on a plastic substrate.

Another object of this invention is to provide a method for treating the surface of the plastic substrate characterized by using such primer composition.

To meet such need, there has now been prepared a primer composition by dissolving in an organic solvent a specific diacryloyloxy compound of the type described hereunder, and have it has now been found that a top-coated plastic substrate prepared by coating a plastic substrate with the primer, drying under heat and thereafter coating the same with a curable resin-containing top-coating finish has improved properties, such as wear resistance, surface hardness, heat resistance and chemical resistance.

DETAILED DESCRIPTION OF THE INVENTION

The primer composition of this invention is prepared by dissolving in an organic solvent at least one diacryloyloxy compound of the formula:

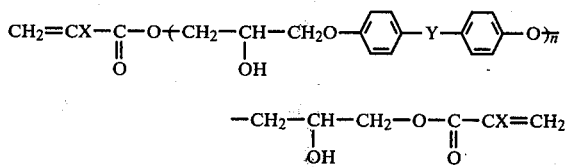

(wherein X is a hydrogen or methyl group; Y is a linear or branched alkylene group having less than 8 carbon atoms or a binding group selected from the class consisting of

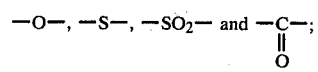

n is an integer of from 1 to less than 10). The acryloyloxy compounds of this type are commercially available and are usually synthesized from a bisphenol compound with an epihalohydrin and an acrylic acid or methacrylic acid.

There is no particular limitation on the type of organic solvent used, except that a solvent which attacks the plastic substrate should never been used. The preferred examples of the solvent are alcohols exemplified by butanol; ethers illustrated by ethyleneglycol monoalkylethers (for example, methyl Cellosolve, ethyl Cellosolve, butyl Cellosolve), p-dioxane and tetrahydrofuran; ketones such as methylethyl ketone. Ethyleneglycol monoalkyl ethers are most preferably used for the polycarbonate substrate.

The primer composition of this invention is prepared by dissolving 0.1 to 50% of diacryloyloxy compound based on the weight of the solution formed.

The primer composition of this invention can be applied to a plastics substrate by brushing, spraying, immersion and other suitable conventional techniques. The substrate coated with the primer composition of this invention may be dried at a temperature within the range of from 30° to 150° C., preferably from 80° to 130° C. Heating for a period in the range of from one to 60 minutes is sufficient to cure the primer and provide a desired primer coating. While the plastic base material may be transparent, translucent or opaque, the primer is particularly suitable for use on"; a transparent plastic substrate, especially a polycarbonate or polymethyl methacrylate resin, because the primer-coating composed of the primer composition of this invention is transparent.

The term "curable resin-containing finish" as used herein, for a protective finish to be applied to the primer-coated plastics substrate, means a protective finish which contains a component capable of being cured and forming a coating. Therefore, it should be understood that the curable component includes a monomer, a prepolymer or a mixture thereof which is cured to form a hardened film under curing conditions such as heating or energy ray irradiation. Accordingly, any protective finish conventionally used for top-coating, for example, curable acrylic lacquer, ultraviolet-curable lacquer and so forth may be employed. But an organoalkoxysilane-containing lacquer which may be able to form a practical top-coating providing high surface hardness, wear resistance and chemical resistance is most preferably used in this invention.

Therefore, one of the preferred embodiments of this invention from the standpoint of practical use is to coat a transparent plastic substrate such as polycarbonate and polymethylmethacrylate with the primer composition of this invention and then coat the primer-coated plastic substrate with the lacquer containing organoalkoxysilane compound, since the resulting protective surface coating is transparent and has improved properties and is very strongly bonded to the plastic substrate. The term "organoalkoxysilane compound-containing lacquer" as used herein means a lacquer containing as an effective ingredient, an organoalkoxysilane compound illustrated by one or more carbon functional silane compounds containing an epoxy group, amino group, acryloxy group, vinyl group and so forth; a mixture of carbon functional silane compounds with an organoxysilane compound or orthosilicate compound; a partial hydrolyzate of such carbon functional silane compounds or a mixture thereof; or a co-hydrolyzate of the mixture of such carbon functional silane compounds. Various kinds of modifiers may be incorporated in these lacquer if desired for example, a functional monomer such as glycidyl methacrylate or a functional organic polymer. Upon heating, these effective ingredients are cured to provide a film coating having high wear resistance, surface hardness, chemical resistance and electrical properties.

As described hereinabove, the present invention provides a primer composition used to improve the bond strength of a surface coating to a plastic substrate and a method for treating a plastic substrate characterized by using such primer composition. It is to be understood that the primer compositions conventionally used, for example, the diepoxy compound as aforementioned may be added to the primer composition of this invention.

This invention will now be described in greater detail by reference to the following Examples and Comparative Examples, wherein all "parts" are by weight unless otherwise noted. The following methods were used to evaluate the performance of hardened film coating prepared in the Examples and Comparative Examples.

APPEARANCE

An appearance test was conducted by means of visual test.

The following three criteria were used to evaluate any change in the film coating.
O: Good (=little or no change)
Δ: Cracked
X: Film coating peeled

SCRATCH RESISTANCE

A pad of #0000 steel wool was rubbed lightly back and forth on the film coating. With one cycle consisting of rubbing back and forth, 15 cycles of rubbing were performed. The following four criteria were used to evaluate film scratching.
A': No scratch
A: Few scratches
B: Countable scratches causing no loss of luster
C: Many scratches resulting in loss of luster

ADHESIVE BOND STRENGTH

A checkered pattern peel test was conducted wherein a razor was used to form a hundred 1 mm$^2$ squares cuts in the film to the depth of the base material, a cellophane tape was applied to the film coating, the tape was quickly torn off from the film coating to provide an angle of 90 degree between the tape and film, and the number of squares of the film left intact was counted. No lost squares is indicated by the symbol 100/100 in the table below.

BOILING TEST

A boiling test was conducted wherein the samples were immersed in hot or boiling water at temperatures of from 80° C. to 100° C. and the changes in appearance after the prescribed time interval were evaluated by visual test. The following three criteria were used to evaluate any change in the film coating.
O: No change
Δ: Cracked
X: Film coating peeled

EXAMPLE 1

5 Parts of commercially available epoxy ester resin (a product of Showa Highpolymer Co., Ltd., a trade name "RIPOXY RESIN VR-90X": a bisphenol-type diacrylate compound having about 770 of average molecular weight) were dissolved in 95 parts of ethyleneglycol monoethylether to form a primer composition. The surface of the polymethyl methacrylate was coated with the primer composition and heated at 80° C. for a period of 10 minutes to form a film coating on the surface of the substrate. Then the film was coated with a top-coating finish prepared by subjecting a mixture of 10 parts of γ-glycidoxypropyl trimethoxysilane, 10 parts of methyl trimethoxysilane, 10 parts of tetramethoxysilane, 30 parts of ethanol, 10 parts of water and 0.05 parts of perchloric acid to co-hydrolysis at 25° C. for a period of 24 hours, and cured by heating at 80° C. for a period of 6 hours. The performance of the cured film coating is set forth in the table below.

EXAMPLE 2

5 Parts of commercially available epoxy ester resin (a product of Showa Highpolymer Co., Ltd., a trade name "RIPOXY RESIN VR 60X"; a bisphenol-type diacrylate compound having 1300 of average molecular weight) were dissolved in 95 parts of ethyleneglycol monoethyl ether to form a primer composition. The surface of the polycarbonate substrate was coated with the primer composition and heated at 100° C. for a period of 10 minutes to form a film coating. And then the film coating was coated with a top-coating finish prepared by subjecting a mixture of 30 parts of γ-methacryloxy propyl trimethoxy silane, 30 parts of N-β-(aminoethyl)γ-aminopropyl trimethoxysilane; 200 parts of methanol, 50 parts of ethyleneglycol monoethylether, 20 parts of water and 0.1 parts of hydrochloric acid to co-hydrolysis at 25° C. for a period of 24 hours and cured by heating at 130° C. for a period of 4 hours. The performance of the cured film coating is set forth in the table below.

EXAMPLE 3

2.5 Parts of epoxyester resin used in Example 1 and one part of commercially available epoxy resin (a product of Shell International Chemical Co., Ltd., a trade name "Epikote 828"; a bisphenol-type diepoxy compound having 330 of average molecular weight) were dissolved in 96.5 parts of ethyleneglycol monoethylether to form a primer composition. The surface of the polycarbonate substrate was coated with the primer composition and heated to form a film coating. And then the film coating was coated with the top-coating finish used in Example 2, and cured by heating at 130° C. for a period of 4 hours. The performance of the cured film coating is set forth in the table below.

COMPARATIVE EXAMPLE 1

The top-coating composition used in Example 1 was directly applied to the surface of polymethyl methacrylate substrate which was not coated with the primer composition and then cured by heating at 80° C. for a period of 6 hours. The performance of the cured film coating is set forth in Table 1.

COMPARATIVE EXAMPLE 2

The top-coating composition used in Example 1 was directly applied to the surface of a polycarbonate substrate which was not coated with the primer composition and then cured by heating at 110° C. for a period of 4 hours. The performance of the hardened film coating is set forth in Table 1.

TABLE 1

| Run | Performance of Hardened Film Coating | | | Appearance and Adhesive Bond Strength after Boiling Test *1 | | |
|---|---|---|---|---|---|---|
| | Appearance | Scratch Resistance | Adhesive Bond Strength | 1 Hr | 2 Hr | 3 Hr |
| Ex. | | | | | | |
| 1 | O | A | 100/100 | O 100/100 | O 100/100 | O 100/100 |
| 2 | O | A' | 100/100 | O 100/100 | O 100/100 | O 100/100 |
| 3 | O | A' | 100/100 | O 100/100 | O 100/100 | O 100/100 |
| Com. Ex. | | | | | | |
| 1 | O | A | 0/100 | x | | |
| 2 | O | A' | 0/100 | x | | |

*1 hot water of 80° C. was used in Example 1 and Comparative Example 1, boiling water was used in Example 2 and Comparative Example 2.

What is claimed is:

1. A method for treating a plastic substrate which comprises
   coating a plastic substrate with the primer composition prepared by dissolving in an organic solvent one or more diacryloyloxy compounds of the formula:

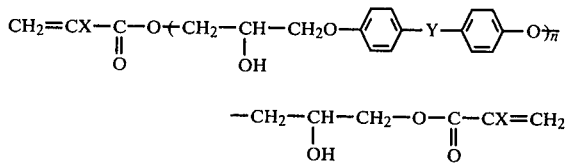

(wherein X is a hydrogen or methyl group; Y is a linear or branched-alkylene group having less than 8 carbon atoms or a binding group selected from the group consisting of $$-O-, -S-, -SO_2- \text{ and } -\underset{\underset{O}{\parallel}}{C}-;$$

n is an integer of from 1 to less than 10),
   drying the primer-coated plastic substrate to provide a dry primer coating consisting essentially of said one or more diacryloyloxy compounds,
   coating the dry primer-coated substrate with a curable resin-containing top-coating finish and
   curing the finish.

2. A method of claim 1 in which the organic solvent is at least one member selected from the group consisting of alcohols, ethers and ketones.

3. A method of claim 1 in which 0.1 to 50% of diacryloyloxy compound based on the weight of the composition is dissolved in the solvent.

4. A method of claim 1 in which the diacryloyloxy compound is prepared by bisphenol A with epihalohydrin and acrylic acid or methacrylic acid.

5. A method of claim 1 in which the primer-coated plastic substrate is dried at a temperature of 80°–130° C.

6. A method of claim 1 in which the plastic substrate is a polycarbonate and the organic solvent is the ethyleneglycol monoalkylether.

7. A transparent product obtained by the process of claim 1 comprising a polycarbonate or polymethyl methacrylate substrate coated with said primer and wherein said primer is coated with said top-coating finish which comprises an organoalkoxysilane compound.

8. A method of claim 1 in which the plastics substrate is a transparent plastic substrate.

9. A method of claim 8 in which the transparent plastic is a polycarbonate or a polymethyl methacrylate.

10. A method of claim 1 in which the primer-coated plastic substrate is dried at a temperature within the range of from 30° to 150° C.

11. A method of claim 1 in which the curable resin-containing top-coating finish is an organoalkoxysilane compound-containing lacquer.

* * * * *